(12) United States Patent
Celli et al.

(10) Patent No.: US 8,413,134 B2
(45) Date of Patent: Apr. 2, 2013

(54) METHOD, SYSTEM AND COMPUTER PROGRAM FOR INSTALLING SOFTWARE PRODUCTS BASED ON PACKAGE INTROSPECTION

(75) Inventors: Massimiliano Celli, Latina (IT); Luigi Pichetti, Rome (IT); Marco Secchi, Rome (IT); Marcello Velati, Ostia Rome (IT)

(73) Assignee: International Business Machines Corporation, Armonk, NY (US)

( * ) Notice: Subject to any disclaimer, the term of this patent is extended or adjusted under 35 U.S.C. 154(b) by 2093 days.

(21) Appl. No.: 11/382,559

(22) Filed: May 10, 2006

(65) Prior Publication Data

US 2006/0259904 A1 Nov. 16, 2006

(30) Foreign Application Priority Data

May 10, 2005 (EP) .................................. 05103884

(51) Int. Cl.
*G06F 9/445* (2006.01)
*G06F 15/177* (2006.01)

(52) U.S. Cl. ...................... 717/174; 717/178; 709/220

(58) Field of Classification Search .................. None
See application file for complete search history.

(56) References Cited

U.S. PATENT DOCUMENTS

| | | | | |
|---|---|---|---|---|
| 5,721,824 A | * | 2/1998 | Taylor | 709/203 |
| 6,006,035 A | * | 12/1999 | Nabahi | 717/175 |
| 6,266,811 B1 | * | 7/2001 | Nabahi | 717/174 |
| 6,279,156 B1 | * | 8/2001 | Amberg et al. | 717/124 |
| 6,367,073 B2 | * | 4/2002 | Elledge | 717/178 |
| 6,378,127 B1 | * | 4/2002 | Delo | 717/174 |
| 6,718,373 B1 | * | 4/2004 | Bearden et al. | 709/220 |
| 6,725,452 B1 | * | 4/2004 | Te'eni et al. | 717/168 |

(Continued)

FOREIGN PATENT DOCUMENTS

| | | | |
|---|---|---|---|
| GB | 2374687 A | * | 10/2002 |
| WO | WO 03085513 A2 | * | 10/2003 |

OTHER PUBLICATIONS

IBM, IBM Tivoli Configuration Manager User's Guide for Software Distribution Version 4.2.1 [online], Dec. 2003 [retrieved Sep. 24, 1990]. Retrieved from Internet: <http://www.redbooks.ibm.com/redbooks/pdfs/sg247426.pdf>, pp. 1-392.*

(Continued)

*Primary Examiner* — Don Wong
*Assistant Examiner* — Todd Aguilera
(74) *Attorney, Agent, or Firm* — Garg Law Firm, PLLC; Rakesh Garg; Libby Z. Toub

(57) ABSTRACT

A method for facilitating the management of a software distribution process is proposed. The method provides the possibility of performing an introspection of a software package (which is used for installing a corresponding software product) before its application on each endpoint. The introspection evaluates any run-time parameters that condition the execution of the actions specified in the software package; in this way, it is possible to determine a list of the actions that will be actually executed during the application of the software package. This list is displayed on a monitor of the endpoint, so as to allow its user to decide whether the application of the software package should be accepted or not. Alternatively, the list of those actions can be collected on a distribution server (from multiple endpoints), to determine an impact of the distribution process on the whole system before its execution.

18 Claims, 6 Drawing Sheets

U.S. PATENT DOCUMENTS

| | | | |
|---|---|---|---|
| 6,829,732 B2 * | 12/2004 | Whiteside et al. | 714/38 |
| 6,854,112 B2 * | 2/2005 | Crespo et al. | 717/174 |
| 6,993,642 B2 * | 1/2006 | Burkhardt et al. | 713/1 |
| 7,376,945 B1 * | 5/2008 | Kakumani et al. | 717/171 |
| 7,904,900 B2 * | 3/2011 | Forsyth | 717/178 |
| 2002/0010910 A1 * | 1/2002 | Crudele et al. | 717/4 |
| 2002/0184619 A1 * | 12/2002 | Meyerson | 717/173 |
| 2003/0023839 A1 * | 1/2003 | Burkhardt et al. | 713/1 |
| 2003/0037327 A1 * | 2/2003 | Cicciarelli et al. | 717/178 |
| 2003/0046682 A1 * | 3/2003 | Crespo et al. | 717/178 |
| 2004/0139176 A1 * | 7/2004 | Farrell et al. | 709/220 |
| 2005/0066015 A1 * | 3/2005 | Dandekar et al. | 709/220 |
| 2005/0172284 A1 * | 8/2005 | Dandekar et al. | 717/175 |
| 2005/0262501 A1 * | 11/2005 | Marinelli et al. | 717/174 |

OTHER PUBLICATIONS

Wise Solutions, Inc., Wisescript Package Studio ® WiseScript Editor Reference [online], 2005 [retrieved May 13, 2011], Retrieved from Internet <http://www.altiris.com/upload/wisescripteditor.pdf>, pp. 1-189.*

* cited by examiner

METHOD, SYSTEM AND COMPUTER PROGRAM FOR INSTALLING SOFTWARE PRODUCTS BASED ON PACKAGE INTROSPECTION

FIELD OF THE INVENTION

The present invention relates to the data processing field. More specifically, the present invention relates to assisting the execution of configuration operations in a data processing system.

BACKGROUND ART

Configuration changes are routine operations in modern data processing systems (such as for installing, removing or updating software products). For this purpose, software distribution applications have been proposed in the last years to facilitate the deployment of the software products from a central site to multiple target computers (or endpoints).

Several software distribution applications known in the art allow some sort of control of the process by users of the endpoints. For example, an administrator can enable the display of a pop-up dialog on each endpoint. The pop-up dialog informs the user possibly logged on the endpoint of the specific distribution process (for example, involving the installation of a new software product). In this way, the user can decide to accept, defer or even reject its execution.

The administrator defines the information provided to the users in the pop-up dialogs at the distribution time of each software product to be installed. For example, this information consists of a message (in the form of a simple descriptive text), which identifies the software product that will be installed and that warns the user of potential dangerous actions (such as any reboot of the endpoint).

A drawback of the solutions known in the art is that the quality of the displayed information is generally very poor. Indeed, the message simply provides an overview of the installation process in very general terms. Moreover, the drafting of the message by the administrator is prone to errors; this drawback is further exacerbated by the fact that the operation is performed by a person, which typically has an overall knowledge of the distribution process but not a good command of the details relating to the installation of every software product. In any case, the message must be sufficiently generic to fit any scenarios that can be encountered on the different endpoints. Nevertheless, sometimes the message may provide misleading information in nonstandard situations (for example, notifying actions that will never be executed).

Therefore, the decision of the user to accept or not the installation of the software product is often based on assumptions that do not reflect the real scenario, which the user will be faced with. As a result, the user may take wrong decisions (for example, deferring or rejecting the installation of software products that instead would have been performed without any problem).

All of the above has a detrimental impact on the process of deploying the software products (which is unnecessary delayed); this drawback is particular acute in large systems, wherein the software products must be installed on a high number of endpoints.

SUMMARY OF THE INVENTION

According to the present invention, the idea of determining the actions that will be actually performed is suggested.

Particularly, an aspect of the present invention proposes a method for assisting configuring a code execution entity (such as an endpoint in a software distribution process). The method includes the step of providing a (software) package, which includes an indication of a set of potential actions for enforcing a software feature (for example, installing, removing or updating a product); one or more of the potential actions are conditioned by a set of run-time parameters. The run-time parameters are then evaluated for the entity; for this purpose, a value belonging to a predetermined range (such as a logical value true or false) is assigned to each run-time parameter. The method now involves determining a set of actual actions (to be performed on the entity for enforcing the software feature) according to those assigned values. An indication of the actual actions is then provided to a controller (such as a user of the endpoint or an administrator of a whole system), in order to enable the application of the package on the entity in response thereto.

In a preferred embodiment of the invention, the evaluation of the run-time parameters is performed on the endpoint.

Typically, at least some of those run-time parameters are based on a current configuration of the endpoint.

As a further enhancement, it is possible to discard the actual actions that do not satisfy a predefined criterion (for example, when they have a minor impact on the endpoint).

In a specific embodiment of the invention, the user of the endpoint is allowed to enable or abort the application of the software package (in response to the display of the actual actions).

In a different embodiment of the invention, the above-described operations are repeated on multiple endpoints, and the corresponding results are then collected on a central site.

Advantageously, this information is used to determine an impact of the application of the software package on the endpoints (before its execution).

A way to further improve this embodiment of the invention is to build the software package without any image of the software product.

Preferably, a service provider (such as a distribution server) controls the execution of the steps of the method.

A further aspect of the present invention proposes a computer program for performing the above-described method.

Moreover, another aspect of the present invention proposes a corresponding system.

The characterizing features of the present invention are set forth in the appended claims. The invention itself, however, as well as further features and the advantages thereof will be best understood by reference to the following detailed description, given purely by way of a nonrestrictive indication, to be read in conjunction with the accompanying drawings.

DETAILED DESCRIPTION

Figure 1A:
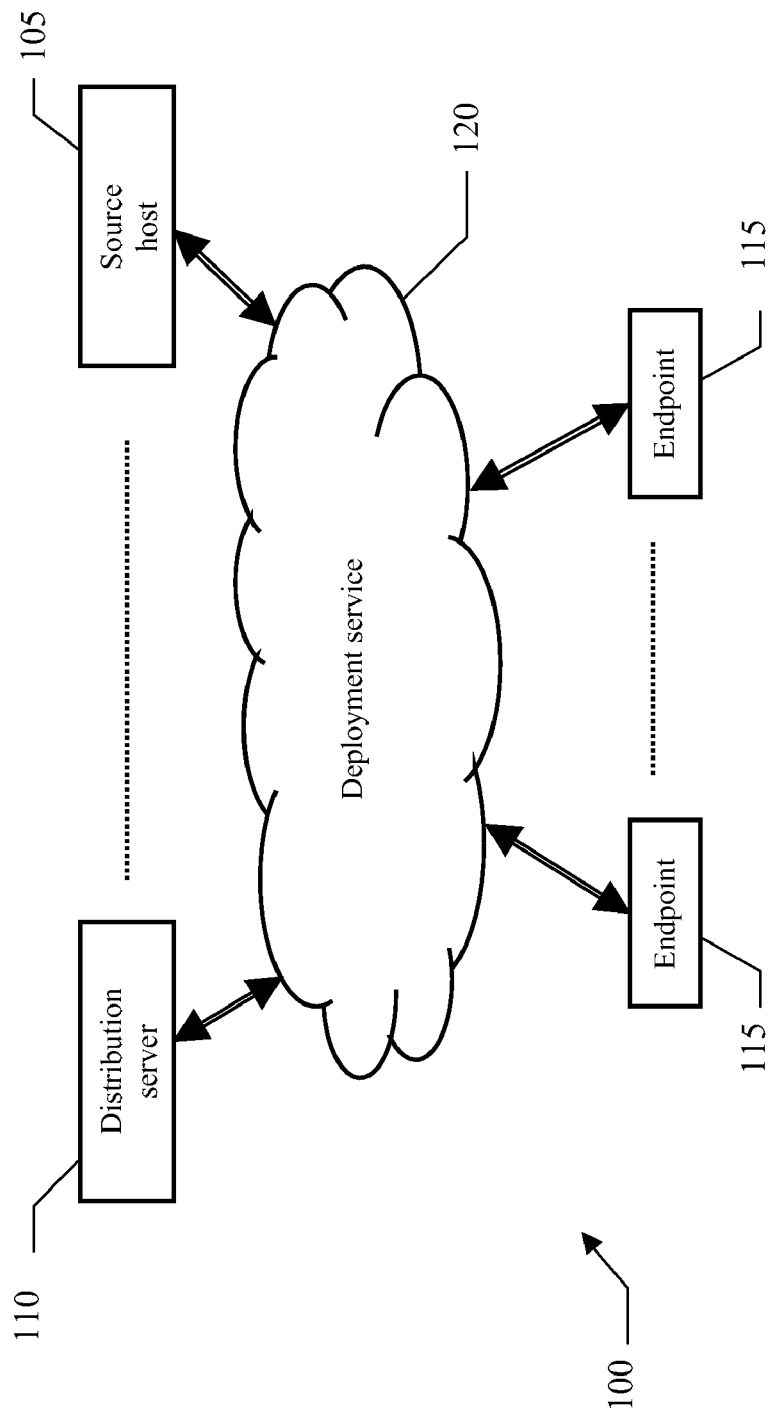
FIG. 1a is a schematic block diagram of a data processing system in which the solution according to an embodiment of the invention is applicable.

With reference in particular to FIG. 1a, a data processing system 100 with distributed architecture is illustrated. The system 100 implements a software distribution infrastructure. Particularly, a source host 105 operates as a preparation and testing central site for software products to be distributed throughout the system 100. The source host 105 interfaces with a server 110, which controls the distribution of the software products to multiple endpoints 115. For this purpose, the source host 105, the distribution server 110 and the endpoints 115 exploit a deployment service 120 (for example, based on the "Multiplexed Distribution or MDIST2" framework); the deployment service 120 is implemented by one or more levels of gateways, which act as depots (or repeaters) for the information to be deployed.

Figure 1B:
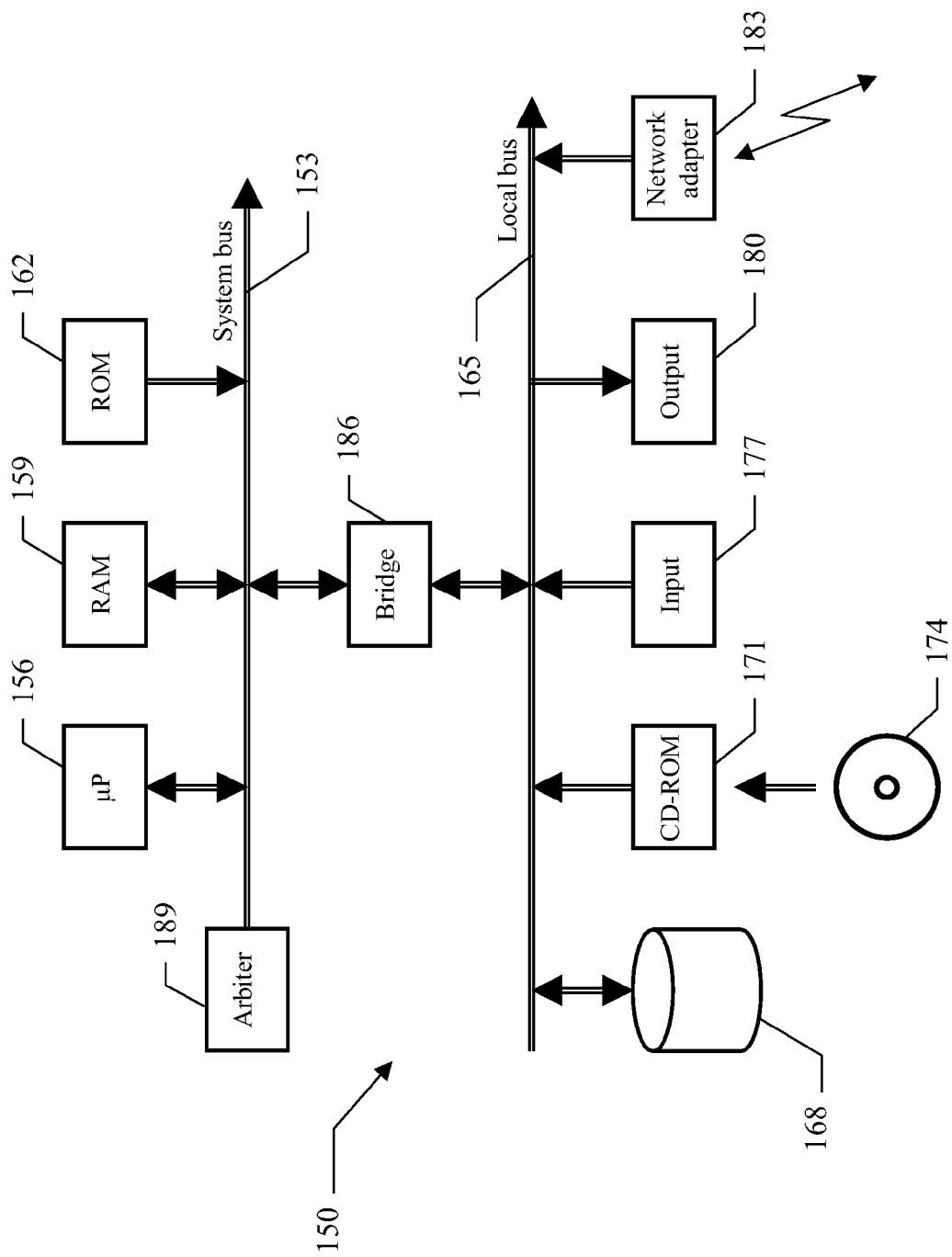
FIG. 1b shows the functional blocks of an exemplary computer of the system.

As shown in FIG. 1b, a generic computer of the system (source host, distribution server or endpoint) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). An adapter 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
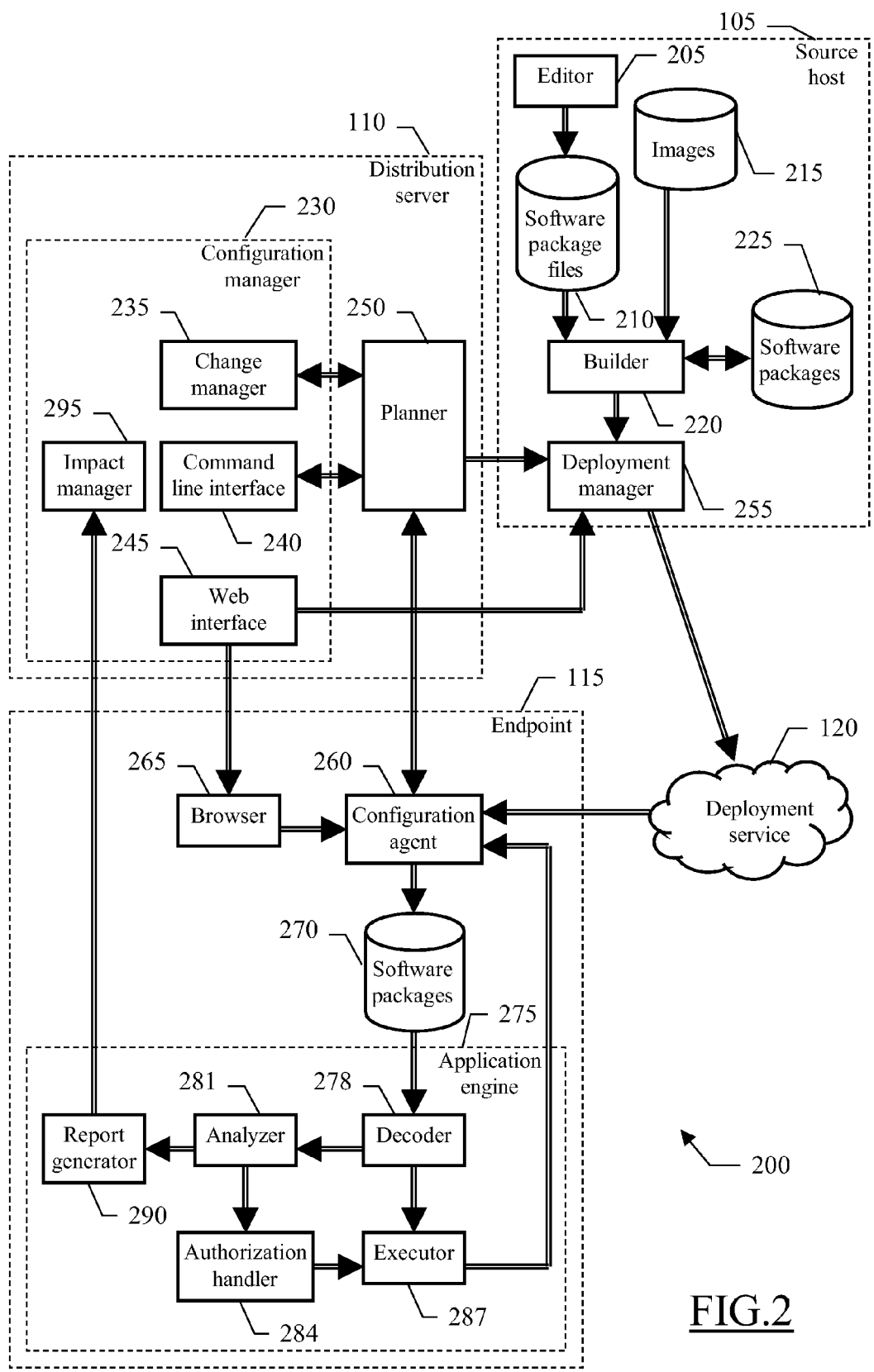
FIG. 2 depicts the main software components that can be used for practicing the solution according to an embodiment of the invention.

Considering now FIG. 2, the main software components that run on the above-described system are denoted as a whole with the reference 200. The information (program and data) is typically stored on the hard-disks and loaded (at least partially) into the corresponding working memories when the program is running.

The program is initially installed onto the hard-disks, for example, from CD-ROMs, both of which are examples of a computer readable non-transitory storage medium.

With reference in particular to the source host 105, an editor 205 provides a graphical interface for defining software package blocks (or simply software packages), which represent the basic elements of a software distribution process. Particularly, each software package is used to enforce a corresponding software product (such as a stand-alone program, a distributed application, a multimedia tool, and the like); the software package can be used either to install a new software product, to remove it, or to update a software product already installed to a new version or service level. The software package consists of an instruction section that defines the actions to be performed on the endpoints for enforcing the desired software product (also referred to as software package file), and a data section that contains an image of any required resources (such as executable modules, configuration files, databases, icons, and the like). The editor 205 creates the software package files for the desired software packages, and saves them into a repository 210; a further repository 215 stores the images of the corresponding software products. A builder 220 accesses the repositories 210 and 215, and accordingly generates the software packages that are then saved into another repository 225.

Moving now to the distribution server 110, a configuration manager 230 (for example, the "IBM Tivoli Configuration Manager or ITCM" by IBM Corporation) controls the distribution of the software packages (provided by the source host 105) to the endpoints. For this purpose, the configuration manager 230 exports different functionalities.

Particularly, an administrator of the system can use a change manager 235 to generate distribution plans consisting of lists of activities to be executed on selected endpoints. Each activity is specified by a target state of a software package; examples of possible target states of the software package are installed and committed, installed in an undoable manner, removed, and so on. Preferably, the change manager 235 builds each distribution plan from reference models; each reference model specifies the target state of one or more selected software packages on the endpoints subscribing to it (identified by a role that is defined, for example, by a category of users, by a department, or by specific features). Once known the current configuration of the endpoints in the system (through a corresponding database, not shown in the figure), the change manager 235 can determine the activities to be performed on each endpoint (associated with a selected reference model) for reaching the target state of each relevant software package (for example, installing a software package that is not available, or removing a software package that is not required any longer).

Alternatively, any operator can use a command line interface (CLI) 240 to distribute a specific software package manually to a set of selected endpoints at a time. As a result, the command line interface 240 generates a corresponding distribution plan, which specifies the desired target state of the software package for every selected endpoint.

At the end, a web interface 245 is used to publish specific software packages. Those software packages are then available for downloading by authorized users of the endpoints.

Both the change manager 235 and the command line interface 240 submit the generated distribution plan to a planner 250, which controls execution of the desired activities on the endpoints. Particularly, the planner 250 causes a deployment manager 255 running on the source host 105 to make available the required software packages. For this purpose, the deployment manager 255 interfaces with the builder 220, which retrieves those software packages from the corresponding repository 225 (or generates them dynamically). The software packages are then uploaded to a depot of the deployment service 120 associated with the source host 105. At the same time, the planner 250 instructs a configuration agent 260 running on each endpoint 115 (only one shown in the figure) to download the corresponding software packages from a further depot of the deployment service 120 (associated with the endpoint 115). The endpoint 115 also includes a browser 265, which allows its user to download the desired software packages on-demand. For this purpose, the browser 265 submits the request of a selected software package to the web interface 245 running on the distribution server 110. As in the preceding case, the web interface 245 instructs the deployment manager 255 on the source host 105 to make available the required software package; at the same time, the browser 265 causes the configuration agent 260 to download this software package from the associated depot of the deployment service 120.

In any case, the software packages so obtained on the endpoint 115 are saved into a repository 270. An application engine 275 (such as the "Software Installation Engine or SIE" by IBM Corporation) accesses the repository 270 and controls the application of the desired software packages on the endpoint 115. For this purpose, as it will be apparent in the following, a decoder 278 regenerates the structure of each software package extracted from the repository 270. An analyzer 281 performs an introspection of the software package and determines the actual actions that should be executed on the endpoint 115 for enforcing the corresponding software product according to run-time information. The analyzer 281 passes a list of the actual actions so obtained to an authorization handler 284. The authorization handler 284 allows the user of the endpoint 115 to decide the application of the software package as a function of the actual actions to be executed. The authorization handler 284 instructs an executor 287 accordingly; the same operation can also be performed by the decoder 278 directly (when the above-described introspection operation is not required). The executor 287 applies the software package on the endpoint 115, and logs the results of the actions that have been executed into a local catalogue (not shown in the figure); the same information is also returned as a feedback to the planner 250 (through the configuration agent 260), so as to allow the change manager 235 to update the database storing the current configuration of the endpoints in the system. Alternatively, the analyzer 281 passes the list of the actual actions to a report generator 290 (without applying the software package on the endpoint 115). The report generator 290 returns the information to an impact manager 295 (included in the configuration manager 230 of the distribution server 110). The impact manager 295 is capable of estimating an impact of the distribution process on the system accordingly.

Figure 3A:
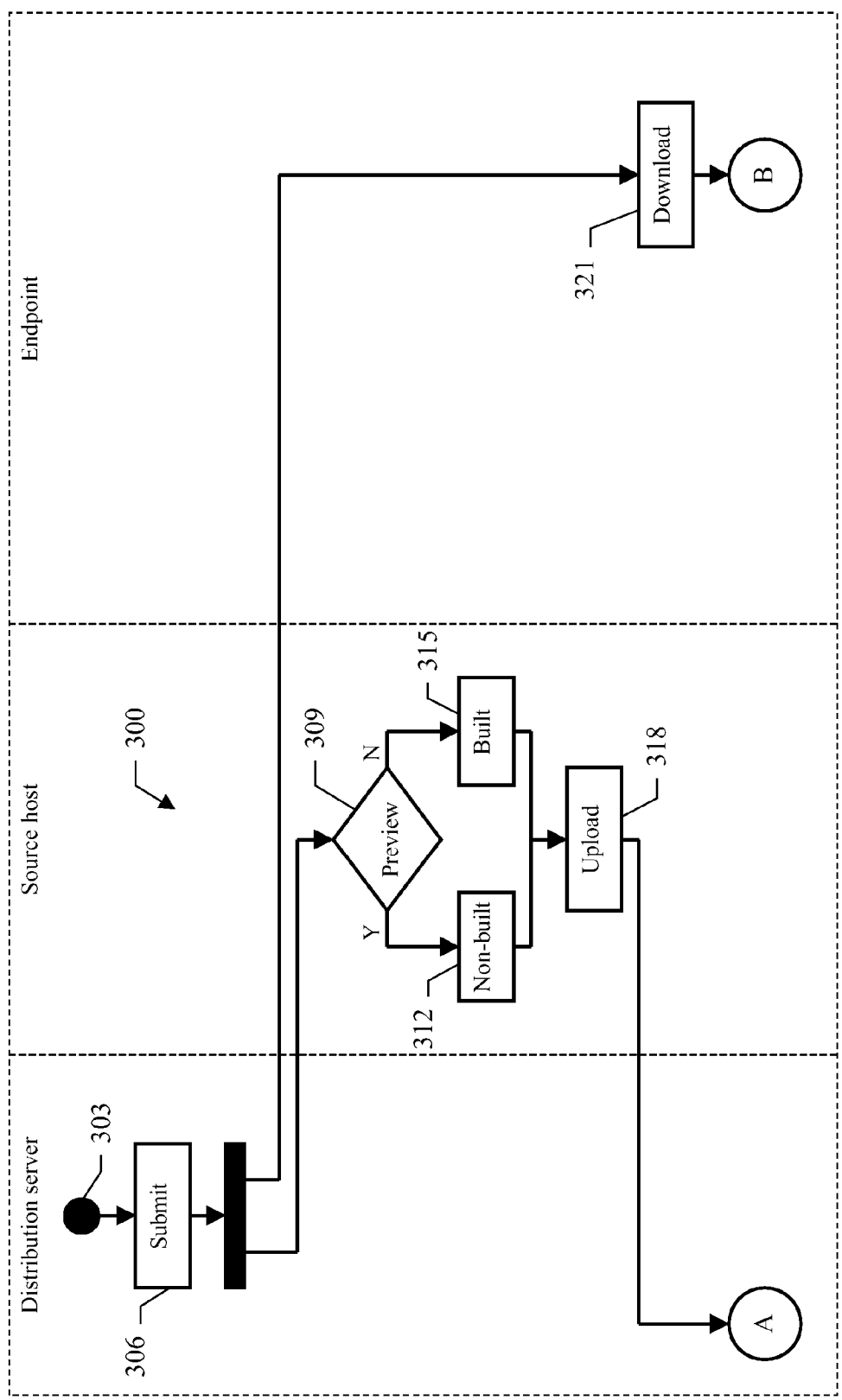
FIGS. 3a-3c show a diagram describing the flow of activities relating to an implementation of the solution according to an embodiment of the invention.
Figure 3B:
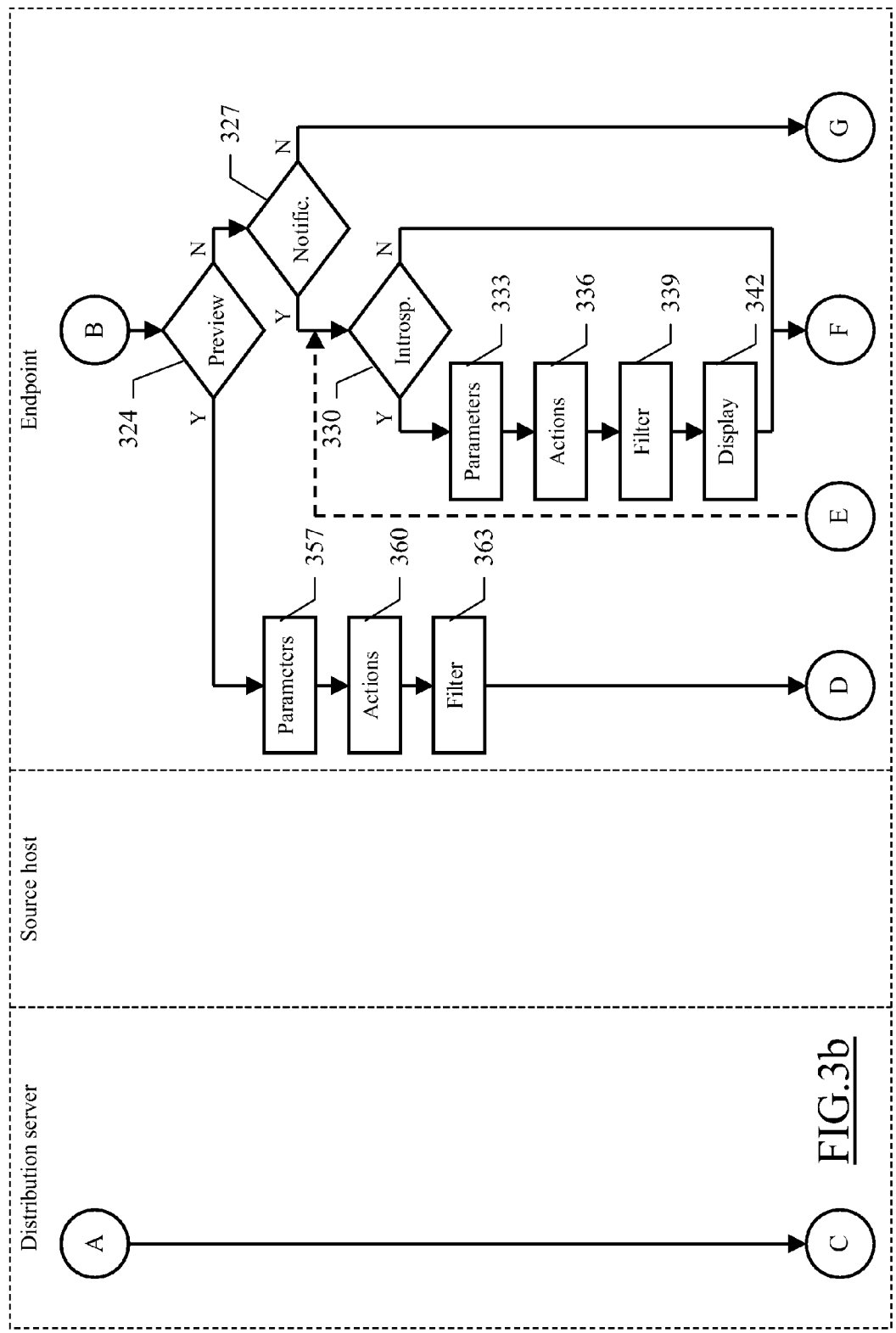
Figure 3C:
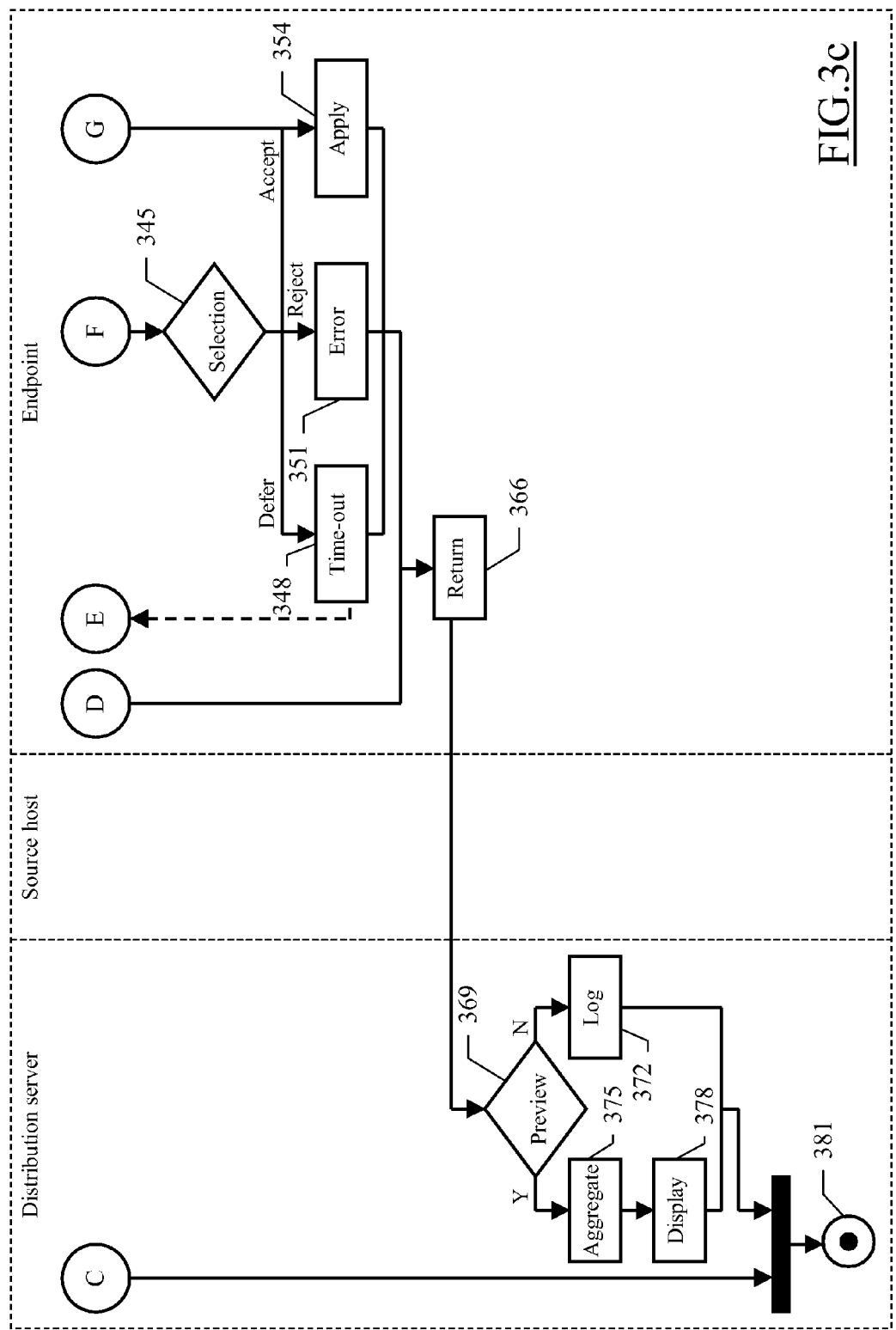

Moving now to FIGS. 3a-3c, the logic flow of an exemplary distribution process that can be implemented in the above-described system is represented with a method 300. The method 300 begins at the black start circle 303 in the swim-lane of the distribution server, and then passes to block 306; in this phase, a distribution request is submitted (either by the administrator through the change manager, by an operator through the command line interface, or by a user through the web interface).

In any case, the flow of activity forks into two branches that are executed concurrently. A first branch consists of blocks 309-318, and a second branch consists of blocks 321-378; the two branches joint at the concentric white/black stop circles 381 (ending the method 300).

The first branch (blocks 309-318) causes the source host to make available each required software package. In order to explain this operation, a brief description of a preferred implementation of the software package is provided in the following. This implementation is based (with some modifications) on the structure proposed in WO-A-003085513, the entire disclosure of which is herein incorporated by reference.

Particularly, the software package is logically organized into a hierarchical structure starting from a root node. The root node is used to specify different attributes of the software package, such as its name, version, creation date, and operative options. More specifically, as it will be apparent in the following, an operative option allows enabling/disabling a user notification mode of the software package (which provides the users of the endpoints with the possibility of controlling the application of the software package); a new operative option allows specifying a preview mode of the software package (which is used to collect information about the impact of the application of the software package before its actual execution). Branch nodes of the hierarchical structure define containers, which comprise collections of child nodes sharing their characteristics. Each leaf node of the hierarchical structure defines an action to be carried out on the endpoints. Some actions are self-contained, whereas other actions require one or more installable objects (consisting of software resources to be added, replaced or removed). For example, self-contained actions specify the reboot of the endpoint or the invocation of an external command, whereas actions with installable objects specify an executable module, a configuration file, a database, an icon, and the like. Each action can be conditioned by one or more parameters to be resolved at run-time; typically, those run-time parameters are based on selections entered by the users of the endpoints, or on hardware/software configurations of the endpoints (such as their CPU model, the RAM size, the operating system installed, or the availability of another software product). The definition of the software package includes the nodes for all the (potential) actions that might be executed for applying the software package on the endpoints (in the different conditions). Each node of the hierarchical structure is associated with an object that instantiates a corresponding class implementing the desired actions.

The software package file (defining the software package) is generated by serializing this hierarchical structure into a binary representation. For this purpose, the editor traverses the hierarchical structure top-down and calls an encode method on the object associated with each node. The called method generates a record of the software package file (given a unique name identifying the corresponding class), which record lists any child node depending thereon.

The real software package is built starting from its software package file. The software package consists of a compressed archive file, to which the software package file is added. The builder then decodes the software package file. For this purpose, the name assigned to each record is used to access a lookup table specifying the corresponding class. Once the object instantiating the class has been created, a decode method is called thereon. The called methods regenerate the hierarchical structure of the software package. The hierarchical structure is then traversed (by calling a build method on the object instantiating the class of the root node, which method in turn calls the same method on the objects associated with its children); for each object, this method adds the code of the corresponding class to the software package and identifies any required installable object. The software package may be generated in two different formats. In a built format, the images of the installable objects are statically embedded into the software package; as a result, the installable objects are frozen so that all the endpoints will receive the same copy of the software package at any time. Conversely, in a non-built format only pointers to the installable objects are added; in this case, the images of the installable objects are dynamically embedded into the software package when it must be distributed to the endpoints, so that they will always receive the last version of each installable object.

Referring back to the method 300, a test is made at block 309 to determine whether the distribution server has requested the distribution of the software package in the preview mode. If so, the software package is generated (or retrieved) in the non-built format at block 312 (without embedding any images of the installable objects), whereas on the contrary the software package is generated in the built format at block 315. In both cases, the method 300 passes to block 318, wherein the software package so obtained is uploaded to the associated depot of the deployment service. The branch then ends at the stop circles 381.

At the same time, at block 321 each endpoint addressed by the software distribution process downloads the software package from the corresponding depot of the deployment service and then decodes it (as in the preceding case). The flow of activity now branches at block 324 according to the preview attribute of the software package. Particularly, when the preview mode is disabled the blocks 327-354 are executed, whereas when the preview mode is enabled the blocks 357-363 are executed; in both cases, the method 300 then passes to block 366 (described in the following).

Considering now block 327 (preview mode disabled), a test is made to determine whether the software package is to be applied in the user notification mode (according to the corresponding attribute). If so, the user is prompted at block 330 to decide whether the corresponding introspection of the software package is to be performed or not. If the user accepts the execution of the introspection operation, the analyzer at block 333 traverses the hierarchical structure of the software package and calls a (new) introspect method on each class. This method evaluates any run-time parameters associated with the object (if necessary); for example, the operation is based on information that is input by the user and/or extracted from a configuration database of the endpoint. The same introspection method at block 336 determines the actual actions that should be executed on the endpoint for applying the software package (according to the evaluation of the corresponding run-time parameters). Continuing to block 339, the analyzer may also filter those actual actions according to a predefined criterion; for example, it is possible to discard the actual actions that have a minor impact on the endpoint (such as the ones that do not involve any reboot, the upgrade of any software product already available, or the removal of any other software products). The method 300 then proceeds to block 342, wherein a message informing the user of the specific distribution process is displayed. The message includes (in addition to general information about the software package), the list of the actual actions so obtained (possibly filtered). The flow of activity then descends into block 345. The same point is also reached from block 330 directly when the user decides to skip the introspection operation (for example, in order not to overload the endpoint).

In any case, the user is prompted at block 345 to authorize the application of the software package. The method 300 then branches according to the operation to be performed on the endpoint. If the user has decided to defer the application of the software package (for example, because s/he is performing some important tasks), a customizable time-out is set at block 348; as soon as this time-out expires, the flow of activity returns to block 330 for repeating the same operations described above. On the other hand, if the user has decided to reject the application of the software package, a corresponding error code is generated at block 351; for example, this decision may be taken when the list of actual actions includes one or more reboot actions (which cause the shutdown of the endpoint) or bootable actions (which invoke external commands that might cause its shutdown), and their execution is not desirable (such as because the endpoint runs high-availability applications). At the end, if the user has accepted the application of the software package (or if the user has skipped its introspection), the operation is enforced at block 354. For this purpose, the executor traverses the hierarchical structure of the software package again and calls a corresponding method on each object (for example, an install or a remove method); this method evaluates any run-time parameters associated with the object (if not already resolved during the introspection operation) and verifies whether the corresponding action can be performed; if so, the action is actually executed (adding or removing the associated installable object when necessary). The same point is also reached from block 327 directly when the user notification mode is disabled (so as to cause the indiscriminate application of the software package). The flow of activity now proceeds to block 366 (from blocks 348, 351 or 354).

In this way, the user is provided with information that is very valuable. Indeed, the displayed message lists the actions that will be actually performed on the endpoint. The generation of this information is automatic (so that any human error is prevented). Moreover, the information so obtained is specific for any endpoint (reflecting the actual environment where the software package will be applied). As a result, the decision taken by the user is always based on correct assumptions. This substantially avoids unnecessary delays in the application of the software package, with a beneficial impact on the deployment of the software products (especially in large systems with a high number of endpoints).

With reference instead to block 357 (preview mode enabled), the same introspection operation is performed (without applying the software package). Particularly, the run-time parameters are evaluated at block 357, the actual actions are determined at block 360 (according to the corresponding run-time parameters), and the list of actual actions is filtered at block 363. The method 300 then descends into block 366.

Considering now block 366, the result of the above-described operations is logged and returned as a feedback to the distribution server. In response thereto, the method branches at block 369 (in the swim-lane of the distribution server) according to the mode of distribution of the software package. Particularly, if the software package was distributed with the preview mode disabled, the information received from the endpoint (indicative of its application) is saved at block 372, so as to track the current configuration of the endpoints in the system. Conversely, if the software package was distributed with the preview mode enabled, the information received from the different endpoints of the system (indicative of the actual actions that should be performed on each one of them for its application) is aggregated at block 375; this operation may provide different indexes, which quantify an impact of the software distribution process on the system (such as the number of reboots required). These indexes are displayed (in a report or in any sort of chart) on the monitor of the distribution server. The branch then ends at the stop circles 381.

In this way, the administrator or the operator obtains a preview of the effects of the distribution process (before its execution). This information is very useful to tune the distribution process and to decide when it must be actually submitted; for example, the administrator/operator can split the distribution process into multiple operations (which have a lower impact on the system), or s/he can schedule its execution at night (when the side-effects of the distribution process on the system are less evident).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include equivalent elements (such as cache memories temporary storing the program or a part thereof to reduce the accesses to the mass memory during execution); in any case, it is possible to replace the computer with any code execution entity (such as a PDA, a mobile phone, and the like).

Even though in the preceding description reference has been made to a specific structure of the software packages, this is not to be intended as a limitation; indeed, the proposed solution can be implemented with generic packages that are defined and/or built in another way (for example, specifying their structure with a plain text having a syntax based on a sequence of stanzas). In any case, the present invention has equal application when the software packages are used to enforce any other software feature (for example, to modify configuration options of software products already installed).

Likewise, the run-time parameters may be evaluated in another way (for example, directly scanning the endpoints).

Moreover, it is possible to have run-time parameters based on different configuration information (such as depending on relationships with other endpoints).

Alternatively, the actual actions to be discarded are determined according to equivalent criteria (generally consisting of any combination of one or more conditions, such as based on an estimated duration of their execution).

Moreover, it is possible to extrapolate any other indication of the impact of the distribution process on the system (for example, as a function of the processing time required or of the duration of any service interruption).

In a similar way, the software package may be built in equivalent formats and/or distributed using any other infrastructure.

Even though in the preceding description reference has been made to a specific service that is deployed by a corresponding provider, this is not to be intended as a limitation (with the execution of the same process that can be controlled by any other entity); for example, it is possible to have a single computer that implements both the distribution server and the source host.

Similar considerations apply if the program is structured in a different way, or if additional modules or functions are provided; likewise, the different memory structures may be of other types, or may be replaced with equivalent entities (not necessarily consisting of physical storage media). Moreover, the proposed solution lends itself to be implemented with an equivalent method (for example, with similar or additional steps). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

Moreover, it will be apparent to those skilled in the art that the additional features providing further advantages are not essential for carrying out the invention, and may be omitted or replaced with different features.

For example, an implementation of the invention wherein the run-time parameters are evaluated on the distribution server is feasible (such as through the information about the current configurations of the endpoints that is available in the corresponding database); in this way, it is possible to obtain a rough evaluation of the impact of the distribution process without overloading the endpoints.

In addition or in alternative (as described above), the run-time parameters can also be based on information entered by the user of the endpoint (and not only on its current configuration).

In any case, nothing prevents the display of all the actual actions that are determined without applying any filtering.

Moreover, any other use of the information obtained through the introspection of the software package is within the scope of the invention. For example, the list of the actual actions determined on each endpoint is returned to the administrator/operator, which then authorizes the application of the corresponding software package accordingly (so as to control the operation remotely even when the endpoint is unattended); in addition, the deployment of the software package may be decided automatically according to the information that was collected on the distribution server (for example, when the number of reboots is below a predefined threshold).

Alternatively, it is possible to display the lists of the actual actions collected on the distribution server from the different endpoints without any aggregation.

It should be readily apparent that a simplified implementation supporting a single format of the software package (always with the required images embedded) is not excluded.

Alternatively, the same solution can be applied in a stand-alone computer, for example, using software packages (such as built with the "ISMP" by InstallShield Corporation) that are manually loaded onto the computer from CD-ROM.

In any case, the present invention lends itself to be carried out with a hardware structure (for example, integrated in chips of semiconductor material), or with a combination of software and hardware.

The invention claimed is:

1. A method for assisting configuring a code execution entity, the method including:
   providing a package including an indication of a set of potential actions for enforcing a software feature, at least one of the potential actions being conditioned by a set of run-time parameters;
   evaluating the run-time parameters for the entity assigning a value belonging to a predetermined range to each run-time parameter;
   determining a set of actual actions from the set of potential actions to be performed on the entity for enforcing the software feature according to the assigned values;
   filtering the set of actual actions to produce filtered actual actions, each filtered actual action satisfying a predetermined criterion, wherein a discarded actual action is included in the set of potential actions in the package, and wherein the filtering is performed using an analyser component in an application engine at the entity; and
   providing an indication of the filtered actual actions to a controller for enabling the application of the package on the entity in response thereto, wherein the filtered actual actions are actual actions remaining in the set of actual actions, and wherein the application of the package on the entity modifies data in a memory associated with the entity data processing system.

2. The method according to claim 1, wherein the step of evaluating the run-time parameters is performed on the entity.

3. The method according to claim 1, wherein at least one of the values is assigned according to a current configuration of the entity.

4. The method according to claim 1, wherein the step of providing the indication of the actual actions includes:
   displaying the indication of the filtered actual actions on the entity; and
   one of authorizing and aborting the application of the package on the entity according to a selection command in response to the display.

5. The method according to claim 1, further including the steps of:

repeating the execution of said steps of providing the package, evaluating the run-time parameters, and determining the actual actions on a plurality of code execution entities; and collecting the indication of the actual actions determined for each entity on a central site.

6. The method according to claim 5, further including the steps of:

determining an indication of an impact of the application of the software package on all the entities according to the corresponding actual actions; and deciding the application of the package on the entities in response to the indication of the impact.

7. The method according to claim 5, wherein the package is suitable to be built in a first format including an image of the software feature or in a second format without said image, the step of providing the package including:

building the package in the second format, and distributing the package to the entities.

8. The method according to claim 1, wherein the execution of the steps of the method is controlled by a service provider.

9. The method of claim 1, wherein determining the set of actual actions further comprising:

introspecting the package for the set of potential actions.

10. A computer program in a computer readable non-transitory storage medium for performing a method for assisting configuring a code execution entity, the method including the steps of:

providing a package including an indication of a set of potential actions for enforcing a software feature, at least one of the potential actions being conditioned by a set of run-time parameters;

evaluating the run-time parameters for the entity assigning a value belonging to a predetermined range to each run-time parameter;

determining a set of actual actions from the set of potential actions to be performed on the entity for enforcing the software feature according to the assigned values;

filtering the set of actual actions to produce filtered actual actions, each filtered actual action satisfying a predetermined criterion, wherein a discarded actual action is included in the set of potential actions in the package, and wherein the filtering is performed using an analyser component in an application engine at the entity; and providing an indication of the filtered actual actions to a controller for enabling the application of the package on the entity in response thereto, wherein the filtered actual actions are actual actions remaining in the set of actual actions.

11. The computer program according to claim 10, wherein the step of evaluating the run-time parameters is performed on the entity.

12. The computer program according to claim 10, wherein at least one of the values is assigned according to a current configuration of the entity.

13. The computer program according to claim 10, wherein the step of providing the indication of the actual actions includes:

displaying the indication of the filtered actual actions on the entity; and one of authorizing and aborting the application of the package on the entity according to a selection command in response to the display.

14. The computer program according to claim 10, further including the steps of:

repeating the execution of said steps of providing the package, evaluating the run-time parameters, and determining the actual actions on a plurality of code execution entities; and collecting the indication of the actual actions determined for each entity on a central site.

15. The computer program according to claim 14, further including the steps of:

determining an indication of an impact of the application of the software package on all the entities according to the corresponding actual actions; and deciding the application of the package on the entities in response to the indication of the impact.

16. The computer program according to claim 14, wherein the package is suitable to be built in a first format including an image of the software feature or in a second format without said image, the step of providing the package including:

building the package in the second format, and distributing the package to the entities.

17. The computer program according to claim 10, wherein the execution of the steps of the method is controlled by a service provider.

18. A system for assisting configuring a code execution entity, the system comprising:

a storage device including a storage medium, wherein the storage device stores computer usable program code; and a processor, wherein the processor executes the computer usable program code, and wherein the computer usable program code comprises:

computer usable code for providing a package including an indication of a set of potential actions for enforcing software feature, at least one of the potential actions being conditioned by a set of run-time parameters;

computer usable code for evaluating the run-time parameters for the entity assigning a value belonging to a predetermined range to each run-time parameter;

computer usable code for determining a set of actual actions from the set of potential actions to be performed on the entity for enforcing the software feature according to the assigned values;

computer usable code for filtering the set of actual actions to produce filtered actual actions, each filtered actual action satisfying a predetermined criterion, wherein a discarded actual action is included in the set of potential actions in the package, and wherein the filtering is performed using an analyser component in an application engine at the entity; and computer usable code for providing an indication of the filtered actual actions to a controller for enabling the application of the package on the entity in response thereto, wherein the filtered actual actions are actual actions remaining in the set of actual actions.

* * * * *